US012752733B2

(12) United States Patent
Matzen et al.

(10) Patent No.: US 12,752,733 B2
(45) Date of Patent: Oct. 6, 2026

(54) BELT RETRACTOR FOR A SAFETY-BELT DEVICE OF A MOTOR VEHICLE

(71) Applicant: AUTOLIV DEVELOPMENT AB, Vargarda (SE)

(72) Inventors: Frank Matzen, Hamburg (DE); Sven Krambeer, Halstenbek (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 19/113,150

(22) PCT Filed: Sep. 18, 2023

(86) PCT No.: PCT/EP2023/075561

§ 371 (c)(1),
(2) Date: Mar. 19, 2025

(87) PCT Pub. No.: WO2024/061786

PCT Pub. Date: Mar. 28, 2024

(65) Prior Publication Data

US 2026/0091757 A1 Apr. 2, 2026

(30) Foreign Application Priority Data

Sep. 19, 2022 (DE) ..................... 10 2022 123 957.8

(51) Int. Cl.
*B60R 22/343* (2006.01)

(52) U.S. Cl.
CPC .................................. *B60R 22/343* (2013.01)

(58) Field of Classification Search
None
See application file for complete search history.

(56) References Cited

U.S. PATENT DOCUMENTS 6,196,487 B1 * 3/2001 Specht ................ F16D 43/2028 242/374
2014/0318915 A1 * 10/2014 Nuding .................. F16D 41/12 192/45.1

(Continued)

FOREIGN PATENT DOCUMENTS

DE 100 59 227 C1 3/2002
DE 10 2014 009 038 B4 8/2017
DE 102018116126 A1 1/2020

(Continued)

*Primary Examiner* — Karen Beck
*Assistant Examiner* — Matthew James O'Neill
(74) *Attorney, Agent, or Firm* — Dickinson Wright PLLC

(57) ABSTRACT

A belt retractor for a seat belt device of a motor vehicle, comprising a rotatably mounted belt reel on which a seat belt of the seat belt device can be taken up, and a reversible belt tensioner comprising a drive wheel which drives the belt reel in the take-up direction upon an activation via the drive wheel, and a positively controlled tensioning coupler which transmits the drive movement from the drive wheel to the belt reel, comprising at least one coupling pawl which is mounted on the drive wheel and can be moved into and out of engagement with a toothing fixed on the belt reel in order to establish and neutralize a rotary connection of the drive wheel, and a control element comprising a first control contour for controlling the engagement movement of the coupling pawl into the toothing fixed on the belt reel.

15 Claims, 6 Drawing Sheets

(56) References Cited

U.S. PATENT DOCUMENTS

Figure 1:
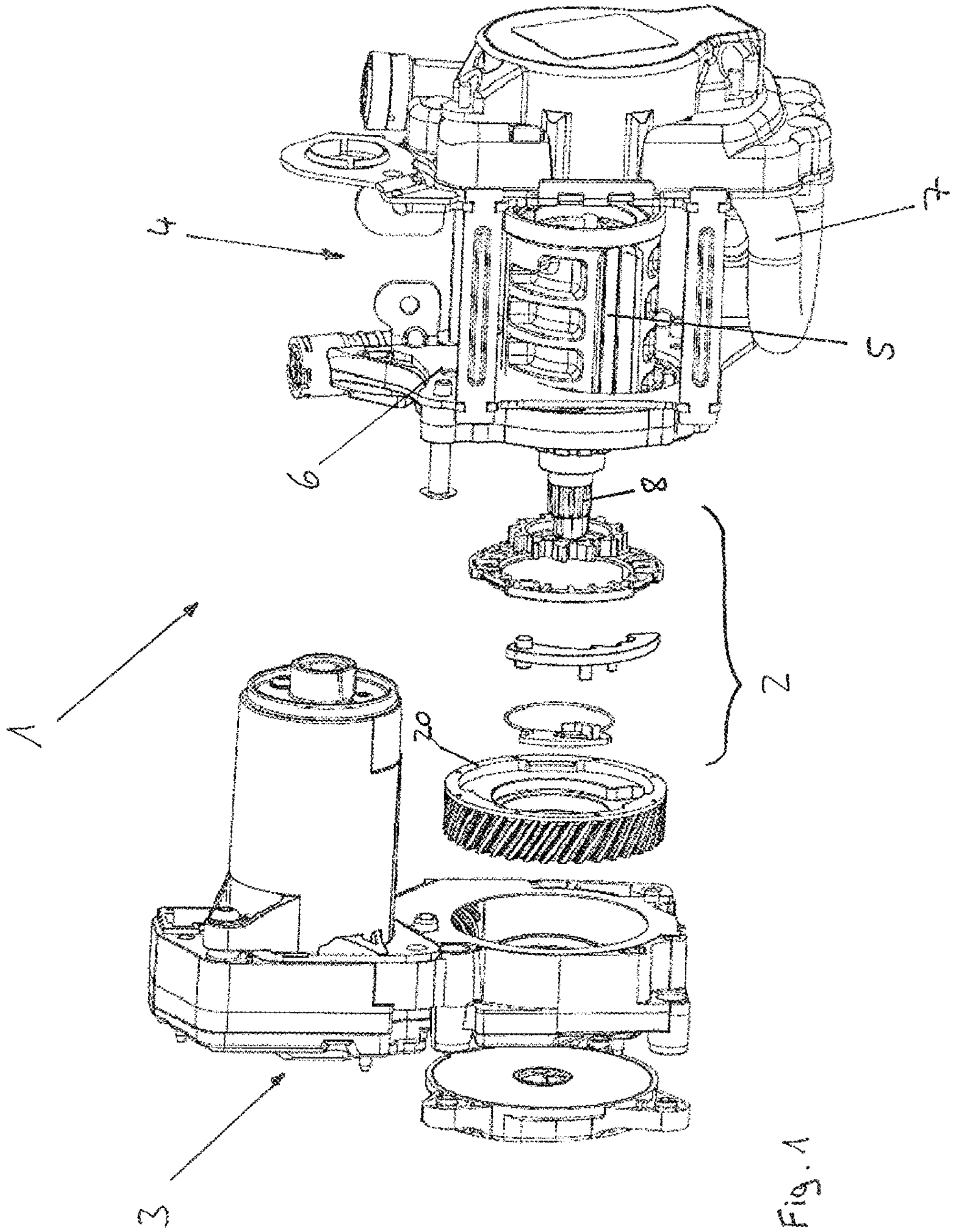

| | | | |
|---|---|---|---|
| 2017/0136987 | A1 | 5/2017 | Holbein et al. |
| 2020/0010047 | A1 | 1/2020 | Matzen et al. |

FOREIGN PATENT DOCUMENTS

| | | | |
|---|---|---|---|
| EP | 2246225 | A1 | 11/2010 |
| EP | 3378710 | A1 | 9/2018 |
| EP | 3590775 | B1 | 1/2022 |
| WO | 2017/045814 | A1 | 3/2017 |

* cited by examiner

BELT RETRACTOR FOR A SAFETY-BELT DEVICE OF A MOTOR VEHICLE

The present invention relates to a belt retractor for a seat belt device of a motor vehicle, having the features of the preamble of claim 1.

Belt retractors are used in seat belt devices of motor vehicles and serve to wind one end of a seat belt provided for restraining an occupant. The belt retractor is fastened either to the vehicle structure or to a vehicle seat fastened to the vehicle structure or to a bench seat fastened thereto. In its basic structure, the belt retractor has a frame provided for fastening purposes and a belt reel rotatably mounted in the frame, wherein the seat belt can be wound onto the belt reel. The belt reel is spring-loaded in the winding direction via a spring and, in the event of a predetermined belt pull-out acceleration being exceeded or vehicle deceleration, can be blocked by means of a blocking device against a further pulling-out of the seat belt so that in order to prevent serious injuries, the occupant is then restrained before impact on the inner vehicle structure.

In order to reduce the occupant load during restraint, force-limiting devices have proven to be advantageous which, in the event of a blocked belt reel and a predetermined belt pull-out force being exceeded, allow a force-limited rotation of the belt reel in the pull-out direction and thus a force-limited forward displacement of the occupant. Since the thereby enabled reduction of the occupant load is directly related to the forward displacement path available, it has furthermore been found to be advantageous to take up the belt slack present in the seat belt by means of a belt tensioner before activation of the force-limiting device in order to increase the available forward displacement path and to couple the occupant as early as possible to the vehicle deceleration.

In belt tensioners, a distinction is drawn between reversible belt tensioners and irreversible belt tensioners or even performance tensioners. Reversible belt tensioners have a lower tensioning capacity of approximately 100 to 800 N and serve to take up the belt slack in a hazardous situation in preparation for a possible subsequent accident. If no accident occurs subsequently, the seat belt will be slackened again. Electric motors which can be controlled particularly well and reversibly have proven successful for driving the reversible belt tensioners. Irreversible belt tensioners have a higher tensioning capacity of 400 to 2000 N and are activated only when the accident can no longer be avoided, that is to say in an early phase of the accident. The irreversible belt tensioners are thus always activated after the reversible belt tensioners. Pyrotechnic drives which cannot be activated again after their one-time activation have proven themselves as drives for irreversible belt tensioners so that in this case, the entire seat belt device with the irreversible belt tensioner has to be replaced.

In this case, belt tensioners can engage at different positions of the seat belt, for example at the belt buckle, the end fitting or even at the belt retractor. When the belt tensioner is used on the belt retractor, it drives the belt reel abruptly in the winding direction in the event of an activation and thereby takes up the belt slack present in the seat belt. For the purposes of the present invention, the term "belt tensioner" should be understood to mean only those belt tensioners which are arranged on a belt retractor and drive the belt reel. Since the belt reel must basically be able to rotate freely in normal use for buckling up and for unbuckling, the drives of both the reversible belt tensioner and also the irreversible belt tensioner are only connected via couplings to the belt reel in the event of an activation. The couplings should be designed such that they do not ever unintendedly establish a rotational connection, as a result of which the normal use of the belt retractor would be impeded due to a disturbance of the rotational movement of the belt reel caused thereby.

Since the reversible belt tensioner is to be deactivated again in the event that an accident does not subsequently occur and the belt retractor is to be used normally again, the coupling of the reversible belt tensioner must moreover likewise be of a reversible design. Furthermore, the coupling of the reversible belt tensioner must then too be deliberately disengaged when an accident subsequently occurs and the irreversible belt tensioner is activated so that the drive movement of the irreversible belt tensioner is not disturbed by the still engaged coupling of the reversible belt tensioner.

Furthermore, the couplings of the various belt tensioners must be designed such that they automatically establish the rotational connection between the drive and the belt reel when the drive is activated, which can be effected, for example, by friction, by inertial forces or by a control profile. The movement of the coupling is thereby positively controlled by the beginning movement of the drive.

Thus, the couplings are on the one hand required to execute the coupling movement automatically when the drive device is activated but to deliberately not execute the coupling movement in other circumstances in order to prevent an undesired coupling connection.

For example, a belt retractor having a reversible belt tensioner which has a friction-controlled coupling with two coupling pawls and a braking element is known from document DE 100 59 227 C1 from the applicant. The coupling pawl is slidably mounted on the drive wheel and, in order to establish a coupling connection, engages in an internal toothing of a clutch bell connected in a rotationally fixed manner to the belt shaft.

A coupling for a belt tensioner, which has two coupling pawls mounted on a drive wheel, referred to therein as an input element, which, in order to establish the coupling connection, engage in an external toothing of an output element that is connected to the belt reel, is also known from DE 10 2014 009 038 B4. To control the movements of the coupling elements, a control element coupled to an inertial mass is provided, on which an input control geometry and an output control geometry are provided to control the movements of the coupling pawls.

Against this background, the invention is based on the object of providing a belt retractor of the generic type in which the transmission of the drive movement of the drive wheel to the belt shaft is further improved.

In order to achieve the object, a seat belt retractor having the features of claim 1 is proposed. Further preferred embodiments of the invention can be gathered from the dependent claims, the figures and the associated description.

According to the basic idea of the invention, it is proposed that at least one first tooth is provided on the coupling pawl, with which the coupling pawl engages in the toothing fixed on the belt reel in the engaged position, and at least one second tooth is provided, and the first or the second tooth is designed as an enlarged catch tooth with which the coupling pawl first engages in the toothing fixed on the belt reel during the engagement movement.

This means that the coupling pawl and its teeth have a contour that is adapted to the toothing fixed on the belt reel. Due to its enlarged design, the enlarged catch tooth first comes into engagement with the toothing fixed on the belt reel and thereby causes a pre-alignment of the coupling pawl to the toothing fixed on the belt reel so that the further tooth then engages in the toothing fixed on the belt reel in a defined alignment without itself becoming blocked in the event of tooth-on-tooth. This synchronizes the engagement movement of the coupling pawl with respect to the toothing fixed on the belt reel, and blocking of the engagement movement due to tooth-on-tooth contact is avoided as far as possible.

It is further proposed that the end face of the first tooth and/or of the second tooth, said end face facing toward the toothing fixed on the belt reel, is aligned such that the angle between the end face of the first tooth and/or of the second tooth and the radially outwardly directed end faces of the teeth of the toothing fixed on the belt reel is less than 30 degrees. Due to the proposed alignment of the end face of the first and/or second tooth to the end faces of the teeth of the toothing fixed on the belt reel, in the event of tooth-on-tooth, the tooth slides off the tooth of the toothing fixed on the belt reel with very low compressive forces without itself becoming jammed.

It is further proposed that a force transmission surface extending in the radial direction is provided on the drive wheel, which force transmission surface is arranged in such a way that the coupling pawl comes into contact therewith by an end-face contact surface as a result of the engagement movement into the toothing, and the drive wheel drives the coupling pawl, in the engaged position, into the toothing fixed on the belt reel in order to transmit the rotary movement to the belt reel via the force transmission surface while exerting a compressive force in the peripheral direction of the drive wheel.

Due to the force transmission surface provided on the drive wheel and extending in the radial direction and the drive of the coupling pawl realized thereabove, which is transmitted to the belt reel by the engagement of the coupling pawl in the toothing that is in a rotationally fixed connection with the belt reel, the drive force is transmitted more immediately and therefore more directly from the drive wheel to the coupling pawl and the belt reel. In so doing, the bearing forces to be absorbed of the coupling pawl on the drive wheel in the rotary joint are simultaneously reduced by dividing the bearing forces between the rotary joint and the force transmission surface extending in the radial direction. Ideally, the drive torque can be transmitted even without a bearing load on the coupling pawl by arranging the rotary joint in such a way that it is located outside the force transmission path from the force transmission surface via the coupling pawl into the toothing arranged fixed on the belt reel.

It is further proposed that the force transmission surface has an inclination in the radial direction relative to the axis of rotation of the drive wheel, which inclination is aligned with the teeth of the toothing fixed on the belt reel. Due to the proposed alignment of the force transmission surface in relation to the alignment of the teeth of the toothing fixed on the belt reel, the teeth form a co-directional reaction surface for transmitting forces, so that the force vectors are also co-directional during the force transmission from the drive wheel to the coupling pawl and from the coupling pawl to the toothing fixed on the belt reel. This allows the force transmission conditions to be optimized in particular with regard to avoiding slipping of the force transmission surfaces as much as possible.

It is further proposed that the force transmission surface is arranged in such a way that the coupling pawl resting thereon is arranged without contact with the first control contour. This means that the first control contour is not loaded during the drive of the belt reel during reversible belt tensioning. This also ensures that the force transmission takes place solely via the force transmission surfaces of the drive wheel, the end-face contact surface of the coupling pawl, and the bearing of the coupling pawl in the rotary joint.

In so doing, the catch tooth is preferably formed by the first tooth which is adjacent to the end-face contact surface. During the engagement movement, the coupling pawl is therefore pulled into the toothing fixed on the belt reel starting from the end facing the end-face contact surface.

It is further proposed in this regard that the coupling pawl is pivotably mounted in a pivot bearing which is arranged on the end of the coupling pawl that is more remote from the end-face contact surface. During a pivoting movement, the coupling pawl pivots radially inwards with the end-face contact surface and in so doing comes into contact by the contact surface with the force transmission surface of the drive wheel. Due to the provided arrangement of the pivot bearing, the coupling pawl executes the largest possible pivoting path with its contact surface. This is in particular advantageous if the catch tooth is formed by the first tooth adjacent to the contact surface, since this improves the initial engagement of said tooth in the toothing fixed on the belt reel on the end face of the coupling pawl, and said tooth executes the largest pivot path. Due to the fact that the catch tooth in the form of the first tooth executes the largest pivot path, it is also particularly easy to ensure that the catch tooth first engages the toothing fixed on the belt reel and accordingly pre-aligns the coupling pawl.

It is further proposed that a first control pin is provided on the coupling pawl, with which control pin the coupling pin slides on the first control contour during the engagement movement. The coupling pawl rests with the first control pin on the first control contour which, through its shape, defines the course of the engagement movement of the coupling pawl in the toothing fixed on the belt reel by the first control pin sliding thereon.

It is further proposed that the first control contour has a blocking portion aligned in the peripheral direction, and the first control pin is arranged on the coupling pawl in such a way that it is arranged radially inwardly relative to the blocking portion, in the engaged position of the coupling pawl. Due to the blocking portion of the first control contour, the coupling pawl is blocked against a radially outward-directed control movement from the toothing fixed on the belt reel during the toothing engagement during the reversible pre-tensioning.

It is further proposed that the first control contour is formed by a spring arm which is fixed with one end to the control element, and the first control pin slides on the spring arm from the fixed end towards the free end during the engagement movement of the coupling pawl. By designing the first control contour as a spring arm and the proposed arrangement thereof, it is possible for the control pin and the coupling pawl to perform slight radial movements relative to the first control contour during the engagement movement. This can prevent movement from being inhibited due to shape inaccuracies or different frictional forces. The spring arm is aligned in such a way that the free resilient end extends starting from the fixed end in the peripheral direction in the direction of rotation of the drive wheel during the drive movement.

It is further proposed that a second control contour is provided on the control element for controlling the disengagement movement of the coupling pawl. The second control contour controls the disengagement movement of the coupling pawl in its course by the individual shape of the second control contour, independently of the engagement movement of the coupling pawl.

In this case, a second control pin can preferably be provided on the coupling pawl, with which control pin the coupling pin slides on the second control contour during the disengagement movement.

It is further proposed that a blocking contour which forms a stop for the coupling pawl in the engaged position is provided on the control element. The blocking contour defines the end position of the coupling pawl after completion of the engagement movement. Furthermore, this limits any further differential movement of the control contour relative to the coupling pawl.

It is further proposed that the blocking contour has a first blocking surface aligned in the radial direction and a second blocking surface aligned in the peripheral direction, wherein the first blocking surface forms the stop, and the coupling pawl is forced radially outwards during a rotary movement of the toothing in the take-up direction of the seat belt, and the control element is forced, by the compressive force thereby exerted on the spring arm by the first control pin, into a relative movement during which the second control pin slides from the first blocking surface onto the second blocking surface, wherein the second blocking surface blocks the coupling pawl against a radially inwardly directed pivoting movement into the toothing fixed on the belt reel. The proposed solution means that when an irreversible belt tensioner is activated and the belt reel rotates in the winding direction as a result, the coupling pawl is automatically pushed out of the engaged position, and the coupling connection is released. In addition, the coupling pawl is simultaneously blocked by the support on the second blocking surface against repeated engagement movement in the toothing fixed on the belt reel.

It is further proposed that the coupling pawl has a curved arc shape and is arranged in such a way that the curved shorter side faces the toothing fixed on the belt reel. The curved coupling pawl therefore engages around the toothing fixed on the belt reel and forms with its curved shorter or also an inner side of a force transmission surface. For this purpose, the inner force transmission surface can for example be provided with the first and/or second tooth.

Figure 2:
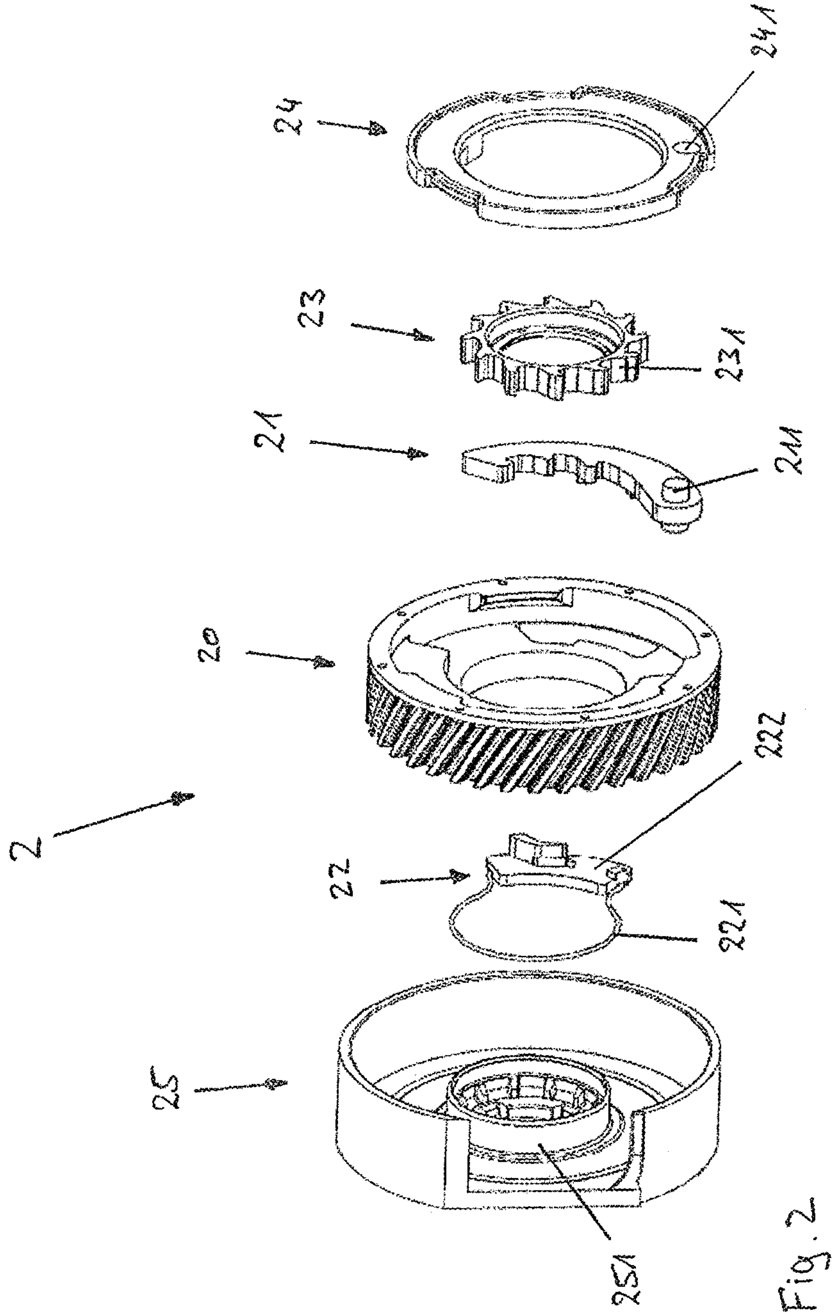
Figure 4:
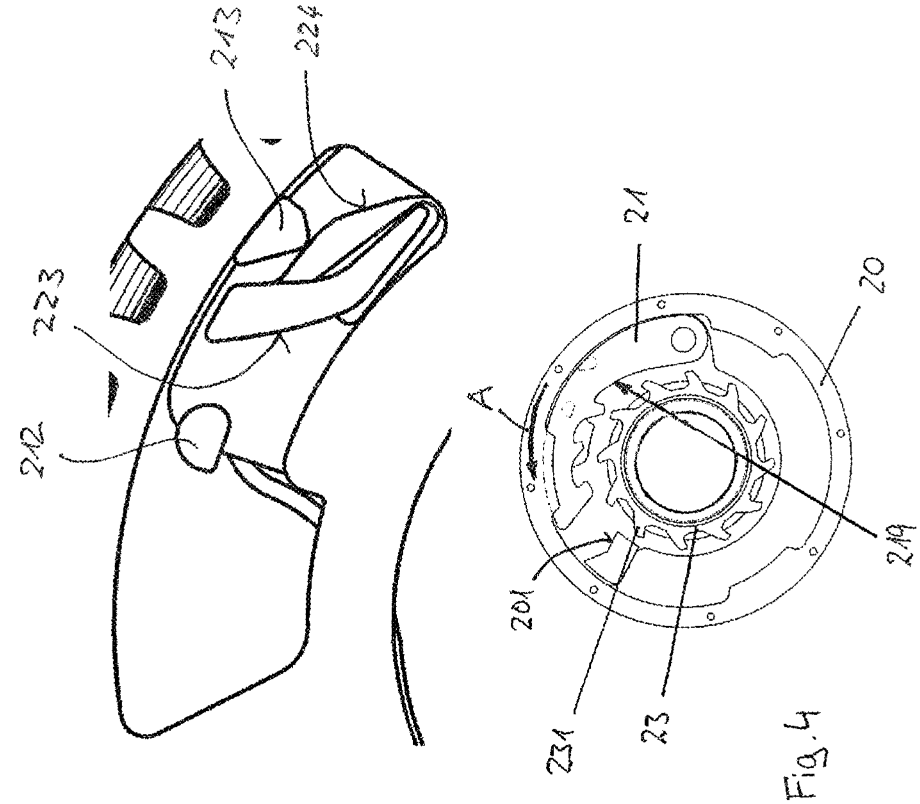
Figure 3:
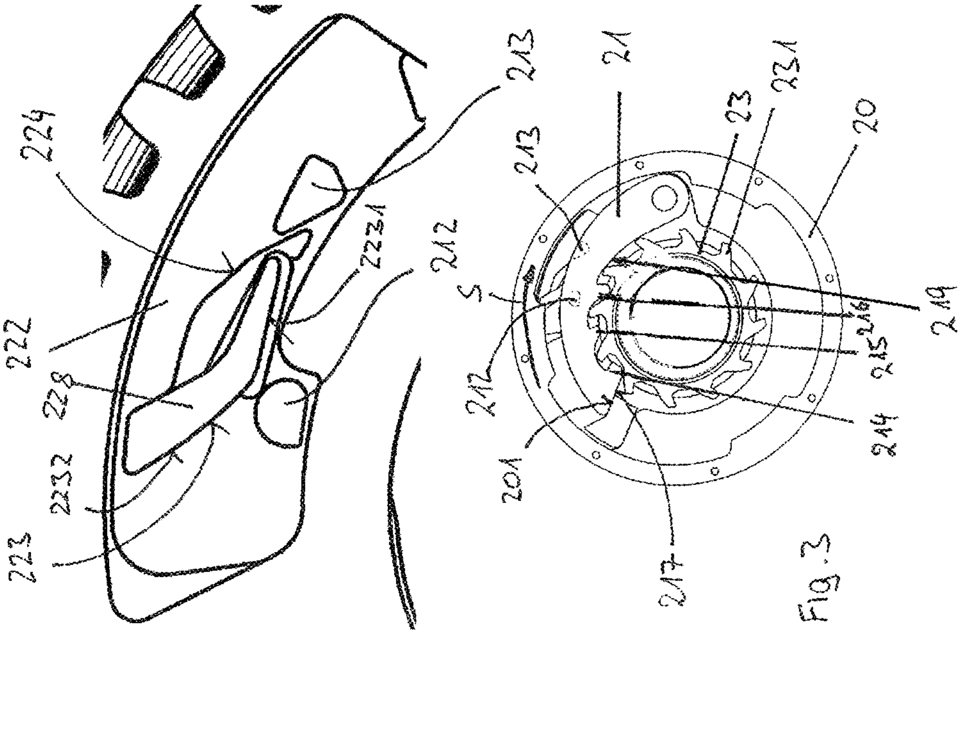
Figure 5:
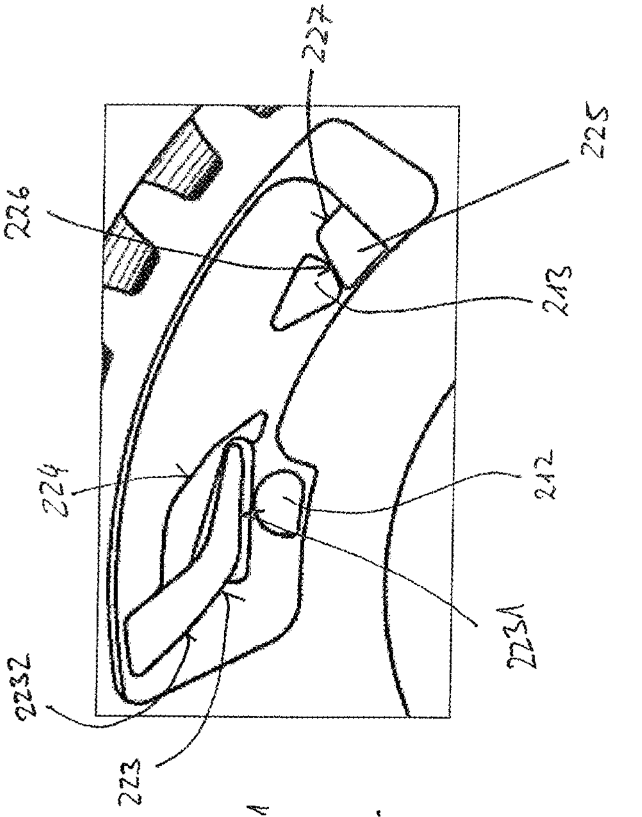
Figure 5:
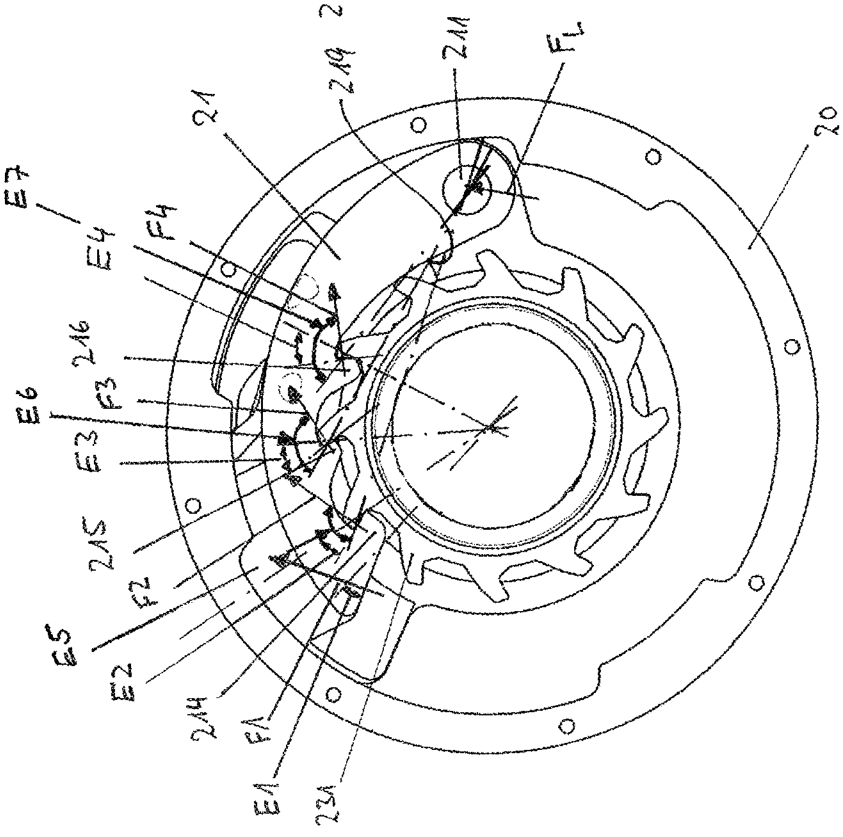
Figure 7:
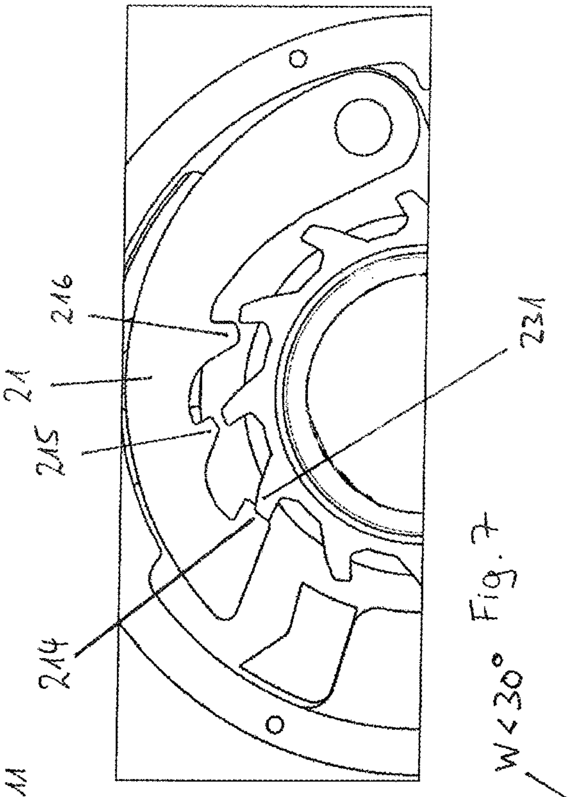
Figure 6:
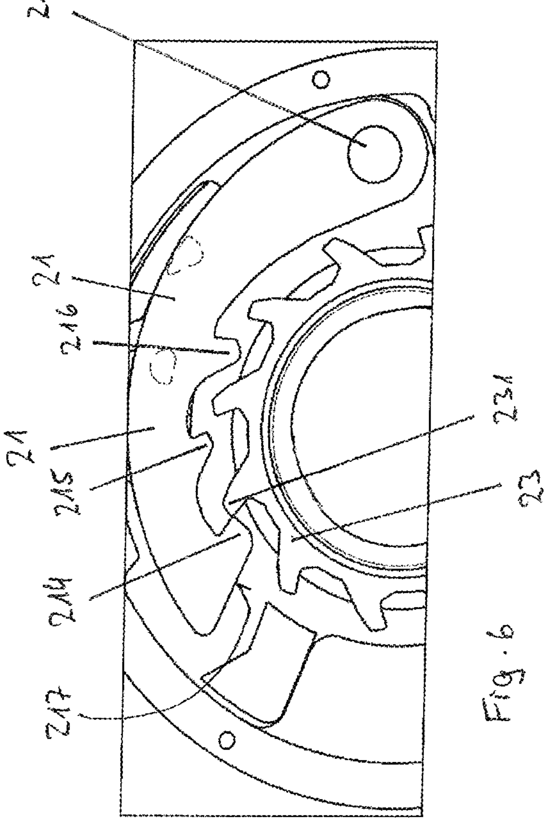
Figure 8:
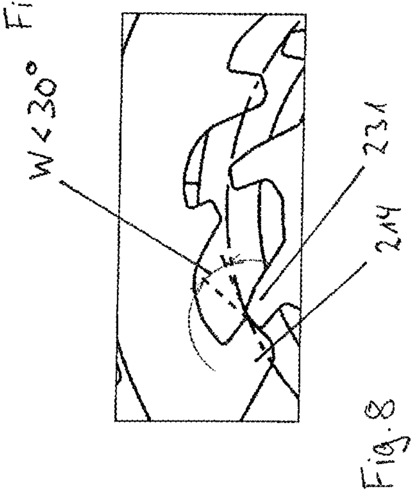
Figure 9:
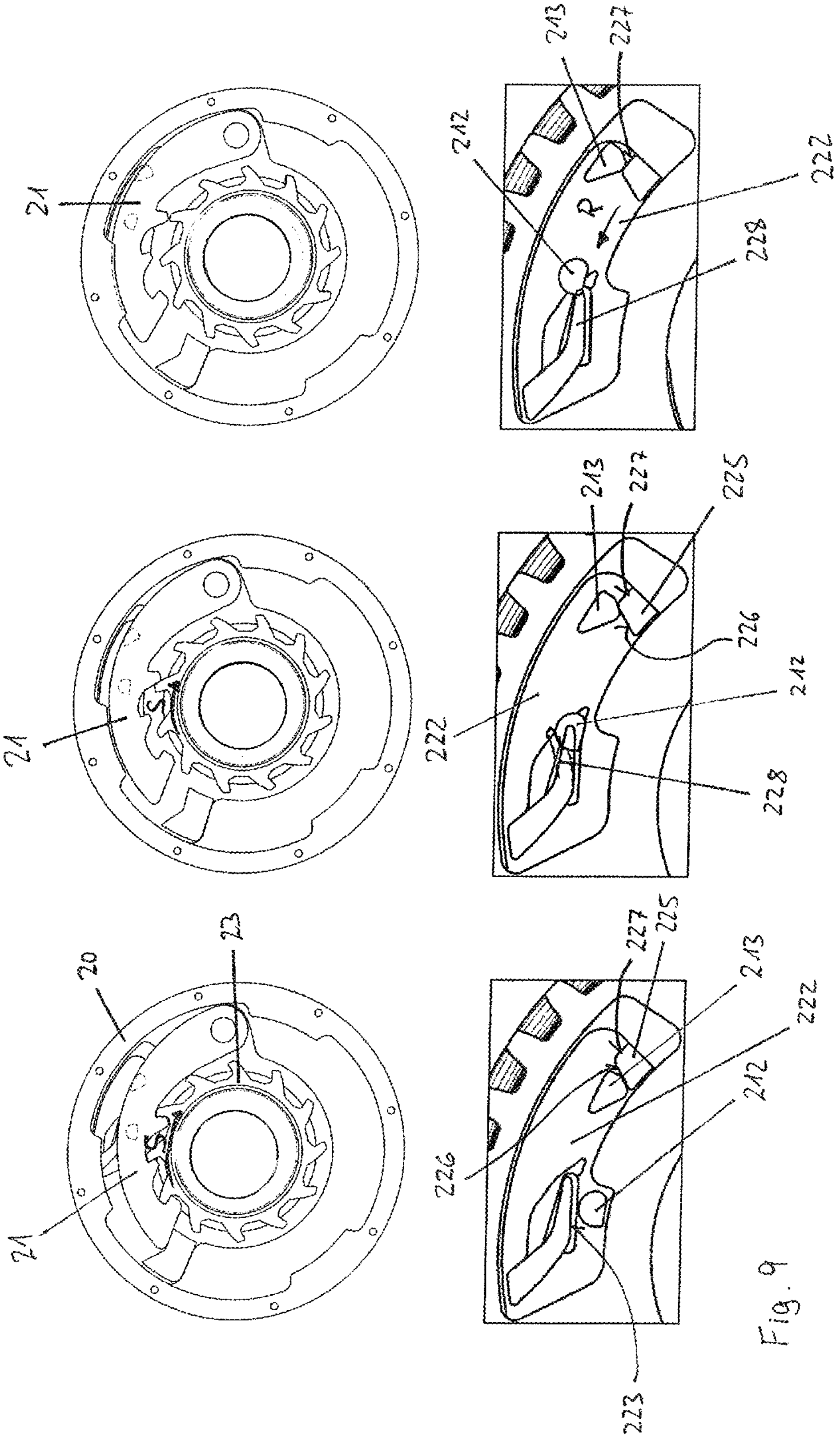

The invention is explained below using preferred embodiments with reference to the accompanying figures. In the figures:

FIG. 1: is a belt retractor according to the invention with a reversible belt tensioner; and FIG. 2: is a drive wheel with a tensioner coupling and a housing part for transmitting the rotary movement of the reversible belt tensioner; and FIG. 3: is the drive wheel, the coupling pawl and the toothing fixed on the belt reel during the engagement movement; and FIG. 4: is the drive wheel, the coupling pawl and the toothing fixed on the belt reel in the disengaged position; and FIG. 5: is the drive wheel, the coupling pawl and the toothing fixed on the belt reel in the engaged position; and FIG. 6: is the drive wheel, the coupling pawl and the toothing fixed on the belt reel in the position of first contact during the engagement movement; and FIG. 7: is the drive wheel, the coupling pawl and the toothing fixed on the belt reel in a tooth-on-tooth position of the first tooth during the engagement movement; and FIG. 8: is the drive wheel, the coupling pawl and the toothing fixed on the belt reel in a tooth-on-tooth position of the first tooth during the engagement movement in an enlarged view; and FIG. 9: is the drive wheel, the coupling pawl and the toothing fixed on the belt reel in different positions during the activation of an irreversible belt tensioner.

FIG. 1 shows a belt retractor 1 according to the invention with a reversible belt tensioner 3, a drive wheel 20, a tensioner coupling 2 and a winding unit 4. The winding unit 4 comprises as basic components a belt reel 5 rotatably mounted in a frame 6 with an axial extension 8 and an irreversible pyrotechnic belt tensioner 7 or power tensioner.

The reversible belt tensioner 3 is activated in pre-accident situations and serves to tighten the seat belt in preparation for a possibly occurring accident. The seat belt is tightened with a tensile force of 100 to 800 N, wherein the tensioning force can be selected to varying levels according to the specifications of the vehicle manufacturer or can be designed in stages with an increase in the tensioning force depending on various pre-accident-specific criteria.

The irreversible belt tensioner 7 is activated only when the accident can no longer be avoided or when it has just started, and causes a greater increase in the tensile force in the seat belt of 400 to 2000 N compared to the increase in the tensile force when the reversible belt tensioner 3 is activated. Accordingly, the belt reel 5 is driven with a considerably greater torque and a higher rotational acceleration when the irreversible belt tensioner 7 is activated than when the reversible belt tensioner 3 is activated.

The reversible belt tensioner 3 comprises an electric motor and a gearbox with a gear mechanism mounted therein that transfers the rotary drive motion of the electric motor to the drive wheel 20.

A toothed ring 23, which can be seen in FIG. 2, is held in a rotationally fixed manner on the extension 8 of the belt reel 5. The toothed ring 23 has a radially outer toothing which, in the fastened position of the toothed ring 23 on the extension 8, forms a toothing 231 fixed on the belt reel.

A housing part 25, which can be seen in FIG. 2, is provided on the gearbox of the reversible belt tensioner 3, in which the drive wheel 20 is rotatably mounted. For this purpose, the housing part 25 has an annular axial extension 251 which passes through a central bearing opening in the drive wheel 20. Furthermore, a control element 22 with an annular spring 221 and a plate element 222 fixed via the annular spring 221 is provided, which is fixed to the axial extension 251 in a frictionally engaged manner by the annular spring 221. In addition, a coupling pawl 21 is provided which is arc-shaped and has a bearing pin 211 protruding on both sides at one of its ends. Furthermore, an annular cover disk 24 with a bearing opening 241 is provided, in which the coupling pawl 21 is mounted on one side with the bearing pin 211, while the bearing pin 211 engages with its other side in a bearing opening of the drive wheel 20 (not visible). The coupling pawl 21 is therefore mounted on both sides in the drive wheel 20 and on the cover disk 24.

The toothed ring 23 and the coupling pawl 21 are arranged in such a way that the coupling pawl 21 faces the toothing 231 fixed on the belt reel with the radially inner shorter side 219 and encloses it, as can be seen in FIGS. 3 and 4. The coupling pawl 21 has on its shorter inner side 219 a toothing which is formed by a first tooth 214, a second tooth 215 and a third tooth 216. The teeth 214, 215 and 216 of the coupling pawl 21 therefore face the toothing 231 fixed on the belt reel. Furthermore, the coupling pawl 21 has, at its end further away from the bearing pin 211 and facing the first tooth 214, an end-face contact surface 217 which is opposite a force transmission surface 201 of the drive wheel 20.

A first control contour 223 and a second control contour 224 are provided on the plate part 222 of the control element 22, as can be seen in FIGS. 3 and 4. The first control contour 223 is realized by a radially inner edge side of a curved spring arm 228, one end of which is fixed to the plate part 222. The second control contour 224 is formed by a curved upper edge side of a projection protruding axially from the plate part 222. In addition, an axially projecting blocking contour 225 with a first radially aligned blocking surface 226 and a second blocking surface 227 aligned in the peripheral direction is provided on the plate part 222, as can be seen in FIG. 5. The coupling pawl 21 is provided with a first axially projecting control pin 212 and a second axially projecting control pin 213 which project axially from the side of the coupling pawl 21 which, in the mounted position, faces the plate part 222 of the control element 22. Conversely, the plate part 222 of the control element 22 is aligned in such a way that the side with the two control contours 223 and 224 faces the side of the coupling pawl 21 on which the control pins 212 and 213 are arranged.

In FIG. 6 to 8, the coupling pawl 21 is enlarged and can be seen in different positions during the engagement movement in the toothing 231 fixed on the belt reel of the toothed ring 23. As can be seen in FIG. 6, the first tooth 214 is enlarged and shaped and aligned in such a way that it first engages in the toothing 231 fixed on the belt reel during the engagement movement. The first tooth 214 is the tooth which borders on the end-face contact surface 217 of the coupling pawl 21 and is therefore the frontmost tooth of the coupling pawl 21. The first tooth 214 is therefore arranged at the end of the coupling pawl 21 further away from the bearing pin 211 and, during the pivoting movement of the coupling pawl 21, executes the greatest pivoting path compared to the other teeth 215 and 216. During the engagement movement, the coupling pawl 21 first engages with the first tooth 214 in the toothing 231 fixed on the belt reel, whereby the coupling pawl 21 is pre-aligned in relation to the toothing 231 fixed on the belt reel. The first tooth 214 therefore acts as a catch tooth. Due to the pre-alignment of the coupling pawl 21, it then comes into engagement by the further teeth 215 and 216 in the toothing 231 fixed on the belt reel, without the engagement movement being blocked by the further teeth 215 and 216 being tooth-on-tooth on the toothing 231 fixed on the belt reel.

If, during the engagement movement in the toothing 231 fixed on the belt reel, the coupling pawl 21 strikes the radially outer end face of a tooth of the toothing 231 fixed on the belt reel with its first tooth 214 in a tooth-on-tooth case as can be seen in FIG. 7, the engagement movement is briefly disturbed. Due to the enlarged design of the first tooth 214 as a catch tooth, the other teeth 215 and 216 are deliberately not yet in contact with the toothing 231 fixed on the belt reel so that the instance of tooth-on-tooth is deliberately limited only to contact of the first tooth 214.

As can be seen in the enlarged view of FIG. 8, the first tooth 214 is shaped on its radially inner end face in such a way that the end face of the first tooth 214 encloses an angle W of less than 30 degrees in the peripheral direction with the end face of the adjacent tooth of the toothing 231 fixed on the belt reel. The first tooth 214 therefore slides along the end face of the tooth of the toothing 231 fixed on the belt reel without blocking the movement. After the first tooth 214 has slid off, it then engages in the subsequent gap to the next tooth of the toothing 231 fixed on the belt reel, and the engagement movement of the coupling pawl 21 is completed.

In FIG. 4, the coupling pawl 21 can be seen in the pivoted out disengaged position. Starting from this position, the engagement movement of the coupling pawl 21 is triggered by driving the drive wheel 20 in the direction of arrow S in FIG. 3. Due to the drive movement of the drive wheel 20, the coupling pawl 21 is also rotated in the direction of arrow S. In this case, the coupling pawl 21 with the first control pin 212 comes to rest on a radially obliquely inwardly directed control section 2232 of the first control contour 223, along which the first control pin 212 of the coupling pawl 21 then slides during the further rotational movement. By the first control pin 212 sliding along the control section 2232 of the first control contour 223, the coupling pawl 21 is forced into a radially inwardly directed engagement movement in the direction of the toothing 231 fixed on the belt reel, wherein the course of the engagement movement is predetermined by the shape and alignment of the control section 2232. The pivoting movement of the coupling pawl 21 is terminated when it comes into contact by its end-face contact surface 217 with a force transmission surface 201 of the drive wheel 20. This position of the coupling pawl 21 can be seen in FIG. 3. To complete the engagement movement of the coupling pawl 21, the latter is then further displaced by the drive wheel 20 over the force transmission surface 201 relative to the toothed ring 23 and the plate part 222 in the direction of the arrow S until it comes into contact by the second control pin 213 with the first blocking surface 226 of the blocking contour 225. The first blocking contour 225 therefore forms, together with the first blocking surface 226, a stop for the movement of the coupling pawl 21. At the same time, the coupling pawl 21 moves with the first control pin 212 into a position in which the first control pin 212 is arranged radially inward relative to a blocking portion 2231 of the first control contour 223. The coupling pawl 21 is therefore subsequently secured against unintentional pivoting out of the toothing 231 fixed on the belt reel. Furthermore, in this engagement position, which can be seen in FIG. 5, the coupling pawl 21 rests with the teeth 214, 215 and 216 on the teeth of the toothing 231 fixed on the belt reel in a force-transmitting manner.

The force transmission surface 201 of the drive wheel 20 is inclined radially outwards and encloses an angle E1 of approximately 15 to 30 degrees to the radial direction opposite to the drive direction of the drive wheel 20 in the direction of arrow S. The end-face contact surface 217 of the coupling pawl 21 is aligned in such a way that, in the engaged position of the coupling pawl, it is aligned at an identical angle E1 to the radial direction and rests flat against the force transmission surface 201 of the drive wheel 20. The tooth flanks of the teeth of the toothing 231 fixed on the belt reel and the opposite tooth flanks of the teeth 214, 215 and 216 of the coupling pawl 21 in the engaged position are aligned in the same direction as the angle E1 of the force transmission surface and also enclose an angle E2 to E4 of approximately 15 to 30 degrees opposite to the drive direction of the drive wheel 20 in the direction of the arrow S so that the force vectors F1 to F4 on the force transmission surface 201 are directed radially outwards to the end-face contact surface 217 and, from the teeth of the toothing 231 fixed on the belt reel, to the teeth 214, 215 and 216. The angles E1 to E4 do not have to be identical. They only have to be co-directional in relation to the radial direction and inclined against the drive direction so that the force vectors F1 to F4 are directed in the same peripheral direction in the direction of the drive rotation movement in the direction of the arrow S. This can counteract a tendency of the tooth flanks and the end-face contact surface 217 to slide off the force transmission surface 201 of the drive wheel 20. The force transmission surface 201 is part of a dimensionally stable contour of the drive wheel 20 and therefore forms a dimensionally stable abutment for the coupling pawl 21 in the adjacent position in FIG. 3. The coupling pawl 21 rests flat with its end-face contact surface 217 on the force transmission surface 201.

Furthermore, the teeth 214, 215 and 216 of the coupling pawl 21 are shaped such that their force transmission surfaces are aligned such that the force vectors F2, F3, and F4, which are each aligned orthogonally to the force transmission surfaces, each have an angle E5, E6, and E7 of greater than 90 degrees to the connecting line which runs through the pivot axis of the coupling pawl 21 defined by the bearing pin 211 and the particular force transmission surface of each of the teeth 214, 215, or 216, as can be seen in FIG. 5.

The driving force is therefore transmitted from the drive wheel 20 via the coupling pawl 21 directly to the toothing 231 fixed on the belt reel of the toothed ring 23 and further to the belt reel 5. As a result, the bearing forces FL to be absorbed in the bearing of the coupling pawl 21 via the bearing pin 211 can be reduced. Ideally, the coupling pawl 21 is pulled onto the toothing 231 and thereby aligns the drive wheel 20 to such an extent that the bearing forces in the bearing of the drive wheel 20 are reduced to zero. It is advantageous that the bearing of the coupling pawl 21 on the bearing pin 211 is arranged at the end remote from the end-face contact surface 217 so that the coupling pawl 21 introduces the torque exerted by the force transmission surface 201 into the toothing 231 fixed on the belt reel without the bearing of the coupling pawl 21 being stressed since it is not located in the force transmission path from the force transmission surface 201 via the contact surface 217 to the toothing 231 fixed on the belt reel.

If the pre-accident situation has ended and does not turn into an accident, the reversible belt tensioning is also stopped, and the tensile force in the seat belt is reduced. For this purpose, the drive wheel 20 is briefly driven against the drive direction in the direction of the arrow A in FIG. 4, whereby the coupling pawl 21 with the first control pin 212 is rotated in the peripheral direction to such an extent that the first control pin 212 is no longer arranged radially inward to the blocking portion 2231 of the first control contour 223. At the same time, the coupling pawl 21 with the second control pin 213 comes into contact with the second control contour 224. The second control contour 224 is curved and directed radially outwards so that the coupling pawl 21 slides off it during the further rotational movement of the drive wheel 20 in the direction of the arrow A and is pulled radially outwards until it is again arranged in the disengaged position, which can be seen in FIG. 4.

If the pre-accident situation turns into an accident, the irreversible belt tensioner 7 is activated, and the belt shaft 5 is suddenly driven in the winding direction together with the toothed ring 23 and the toothing 231 fixed on the belt reel, which is shown in FIG. 9 in the left-hand illustration by the direction of the arrow S. At the beginning of the drive movement of the drive wheel 20, the coupling pawl 21 is still in the engaged position which corresponds to the position of the coupling pawl 21 in FIG. 5. Due to the rotational movement of the toothed ring 23, the coupling pawl 21 is forced radially outward by the teeth of the toothing 231 fixed on the belt reel sliding on the teeth 214, 215 and 216, wherein the first control pin 212 displaces the spring arm 228 radially outward, and the second control pin 213 is moved radially outward on the first blocking surface 226 of the blocking contour 225, as can be seen in the middle illustration in FIG. 9. Due to the deformation of the spring arm 228, a peripheral force is exerted on the plate element 222 of the control element 22, which displaces the plate element 222 in the direction of the arrow R as soon as the second control pin 213 no longer rests laterally on the first blocking surface 226. By displacing the plate element 222, the latter, with the second blocking surface 227 of the blocking contour 225, moves into a position supporting the second control pin 213 radially on the inside. Furthermore, the first control pin 212 overcomes the spring arm 228 so that the latter springs back and blocks the first control pin 212 against a backward-directed movement, as can be seen in the right-hand illustration of FIG. 9. Subsequently, the coupling connection between the reversible belt tensioner 3 and the belt reel 5 is canceled, and the irreversible belt tensioner 7 can drive the belt reel 5 without interference from the reversible belt tensioner 3. The spring arm 228 is aligned in such a way that the free resilient end extends starting from the fixed end in the peripheral direction in the direction of rotation of the drive wheel 20 during the drive movement. On the one hand, this can enable radial spring movements so that manufacturing inaccuracies can be compensated for. In addition, the direction of the spring arm 228 in the direction of the drive movement of the drive wheel 20 forces the movement of the plate element 222 in the direction of the arrow R, i.e. against the direction of rotation of the drive wheel 20, during the drive movement.

The coupling pawl 21 is subsequently irreversibly blocked against a backward-directed pivoting movement into the engagement position, which, however, is not detrimental to the function of the belt retractor since this must be replaced anyway after the activation of the irreversible belt tensioner 7.

The invention claimed is:

1. A belt retractor for a seat belt device of a motor vehicle, comprising:

a rotatably mounted belt reel on which a seat belt of the seat belt device can be taken up, and a reversible belt tensioner comprising a drive wheel which drives the belt reel in the take-up direction upon an activation via the drive wheel, and a positively controlled tensioning coupler which transmits the drive movement from the drive wheel to the belt reel, comprising at least one coupling pawl which is mounted on the drive wheel and can be moved into and out of engagement with a toothing fixed on the belt reel in order to establish and neutralize a rotary connection of the drive wheel, and a control element comprising a first control contour for controlling the engagement movement of the coupling pawl into the toothing fixed on the belt reel, wherein at least one first tooth is provided on the coupling pawl, with which tooth the coupling pawl, in the engaged position, engages in the toothing fixed on the belt reel, and at least one second tooth is provided, and the at least one first tooth or the at least one second tooth is designed to form an enlarged catch tooth with which, during the engagement movement, the coupling pawl first comes into engagement in the toothing fixed on the belt reel.

2. The belt retractor according to claim 1, wherein:

the end face of the at least one first tooth and/or of the at least one second tooth, said end face facing toward the toothing fixed on the belt reel, is aligned such that the angle (W) between the end face of the first tooth and/or of the second tooth and the radially outwardly directed end faces of the teeth of the toothing fixed on the belt reel is less than 30 degrees.

3. The belt retractor according to claim 1, wherein:

a force transmission surface extending in the radial direction is provided on the drive wheel, which force transmission surface is arranged such that the coupling pawl comes to rest thereon, via the engagement movement into the toothing fixed on the belt reel, with an end face contact surface, and the drive wheel drives the coupling pawl, in the engaged position, into the toothing fixed on the belt reel in order to transmit the rotational movement onto the belt reel via the force transmission surface while exerting a compressive force in the peripheral direction of the drive wheel.

4. The belt retractor according to claim 3, wherein:

the force transmission surface has an inclination in the radial direction relative to the axis of rotation of the drive wheel, which inclination is aligned with the teeth of the toothing fixed on the belt reel.

5. The belt retractor according to claim 3, wherein:

the force transmission surface is arranged such that the coupling pawl resting thereon in the engaged position is arranged without contact with the first control contour.

6. The belt retractor according to claim 3, wherein:

the catch tooth is formed by the at least one first tooth, which adjoins the contact surface.

7. The belt retractor according to claim 3, wherein:

the coupling pawl is mounted pivotably in a pivot bearing which is arranged on the end of the coupling pawl more distant from the end-face contact surface.

8. The belt retractor according to claim 1, wherein:

a first control pin is provided on the coupling pawl, with which pin said pawl slides on the first control contour during the engagement movement.

9. The belt retractor according to claim 8, wherein:

the first control contour has a blocking portion aligned in the peripheral direction, and the first control pin is arranged on the coupling pawl in such a way that it is arranged radially inwardly relative to the blocking portion, in the engaged position of the coupling pawl.

10. The belt retractor according to claim 1, wherein:

the first control contour is formed by a spring arm which is fixed at one end to the control element, and the first control pin slides away from the fixed end towards the free end during the engagement movement of the coupling pawl on the spring arm.

11. The belt retractor according to one of claim 1, wherein:

a second control contour for controlling the disengagement movement of the coupling pawl is provided on the control element.

12. The belt retractor according to claim 11, wherein:

a second control pin is provided on the coupling pawl, with which pin said pawl slides on the second control contour during the disengagement movement.

13. The belt retractor according to claim 1, wherein:

a blocking contour, which forms a stop for the coupling pawl in the engaged position, is provided on the control element.

14. The belt retractor according to claim 13, wherein:

the blocking contour has a first blocking surface which is aligned in the radial direction, and a second blocking surface which is aligned in the peripheral direction, wherein the first blocking surface forms the stop, and the coupling pawl, in the event of a rotational movement of the toothing fixed on the belt reel, is forced radially outwards in the take-up direction of the seat belt, and via the compressive force exerted here on the spring arm by the first control pin, the control element is forced to perform a relative movement during which the second control pin slides from the first blocking surface onto the second blocking surface, the second blocking surface blocks the coupling pawl against a radially inwardly directed pivoting movement into the toothing fixed on the belt reel.

15. The belt retractor according to claim 1, wherein:

the coupling pawl has a curved arcuate shape and is arranged such that the curved shorter side faces the toothing fixed on the belt reel.

* * * * *